(12) United States Patent
Berg et al.

(10) Patent No.: US 7,807,285 B1
(45) Date of Patent: Oct. 5, 2010

(54) BATTERY CONNECTION STRUCTURE AND METHOD

(75) Inventors: Paul Berg, Northridge, CA (US); Alex Z. Pàl, Montrose, CA (US); Jose A. Ulloa, Valencia, CA (US); Michael Escobar, Pasadena, CA (US); M. Elizabeth Bush, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 1715 days.

(21) Appl. No.: 10/820,955

(22) Filed: Apr. 7, 2004

(51) Int. Cl.
*H01M 2/26* (2006.01)
(52) U.S. Cl. .......................... 429/97; 429/211
(58) Field of Classification Search ............ 429/54, 429/53, 55, 178, 211, 162, 177, 96, 123, 429/161, 176, 94, 97
See application file for complete search history.

(56) References Cited

U.S. PATENT DOCUMENTS

| 5,663,013 A | 9/1997 | Narukawa et al. |
| 5,912,089 A | 6/1999 | Kitano et al. |
| 6,579,640 B1 * | 6/2003 | Nagase et al. ............... 429/54 |
| 6,656,631 B2 | 12/2003 | Zayatz et al. |
| 6,926,996 B2 * | 8/2005 | Shelekhin et al. ............ 429/177 |
| 2003/0077511 A1 | 4/2003 | Mizuno et al. |
| 2003/0091897 A1 | 5/2003 | Oogaku et al. |
| 2003/0104276 A1 | 6/2003 | Mizuno et al. |
| 2003/0118903 A1 | 6/2003 | Ogaku |
| 2004/0131935 A1 * | 7/2004 | Munenaga et al. .......... 429/211 |
| 2004/0161662 A1 * | 8/2004 | Kim et al. .................... 429/94 |

* cited by examiner

*Primary Examiner*—Jennifer Michener
*Assistant Examiner*—Monique Wills
(74) *Attorney, Agent, or Firm*—Garnlovich, Dodd & Lindsey, LLP

(57) ABSTRACT

An energy storage device, such as an electrical storage battery, having a unique terminal structure and sealing arrangement. The battery generally includes a case in which an electrode assembly is disposed, and a cover provided with a fill hole and fill plug, and a terminal structure that forms a battery terminal. Both the positive and negative electrode tabs are compressed by a fastener that seals the battery and forms a battery terminal. The battery case can be positive, negative, or neutral.

22 Claims, 3 Drawing Sheets

BATTERY CONNECTION STRUCTURE AND METHOD

TECHNICAL FIELD

This invention relates generally to an energy storage device, and more particularly, to an electrical storage battery and a method for manufacturing the same.

BACKGROUND

Electrical storage batteries are in use in a wide range of applications. As improved battery technology allows battery use in more and more demanding applications, the requirements imposed on the batteries' physical construction increase as well. For example, new battery technologies have yielded small and lightweight batteries with long storage lives and high energy output capabilities. As the size of these batteries has decreased, an expanded range of applications has developed, including medical devices used to monitor and treat human disease conditions and to maintain normal body functioning. Batteries for medical devices are subject to very exacting requirements, such as a long useful life, high power output, low self-discharge rate, compact size, high robustness and reliability over a long time, and highly reliable sealing components. In addition, the manufacture and assembly of the batteries should be simple and cost effective.

SUMMARY

The present invention is directed to an energy storage device, more specifically to an electrical storage battery assembly, and related manufacturing method that substantially obviate one or more of the problems due to limitations and disadvantages of the related art, and provide devices having a reliable, secure, and robust construction, and that are suitable for use in medical devices. In particular, a simplified internal battery connection structure and method for both the positive and negative electrodes is provided. Additional features and advantages of the invention will be set forth in the descriptions that follow and will be apparent from the description, or may be learned by practice of the invention. It is to be understood that the foregoing description is exemplary and intended to provide further explanation of the invention as claimed.

DETAILED DESCRIPTION

The present invention applies generally to energy storage devices, such as electrical storage batteries and capacitors. The following detailed description uses an electrical storage battery as an example, but the invention as defined by the claims is not limited to batteries. An electrical storage battery according to embodiments of the present invention is described with reference to the drawings. The structure of the electrical storage battery is described generally first, followed by detailed descriptions of the various parts.

Figure 1:
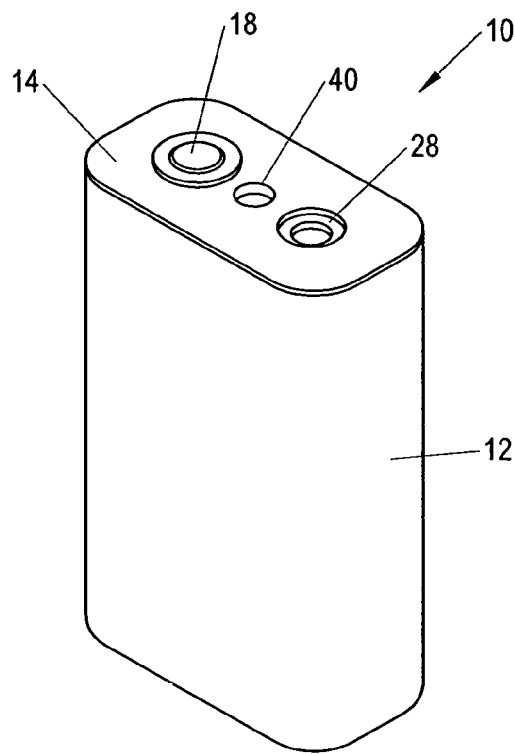
FIG. 1 schematically illustrates the exterior of an energy storage device according to an embodiment of the present invention.
Figure 2:
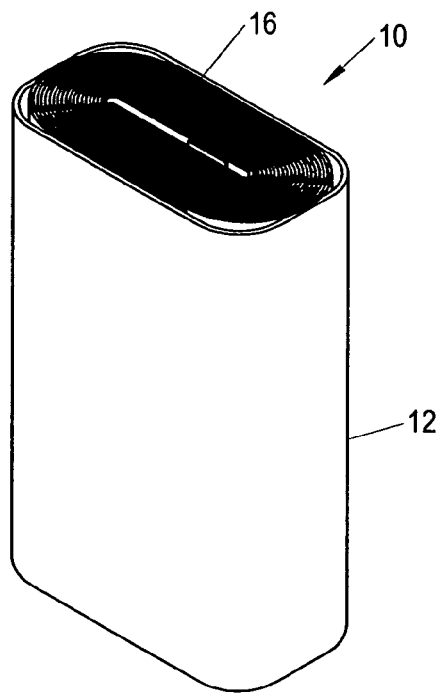
FIG. 2 shows an electrode assembly disposed within the case of the energy storage device.

As shown in FIGS. 1 and 2, the battery 10 generally comprises an electrode assembly 16 disposed within a case 12, which has an opening covered by a top cover 14. The electrode assembly 16 includes a positive electrode member and a negative electrode member, and one or more separator members interposed in between. In one embodiment, as shown in FIG. 2, the electrode members and the separator member are in the form of electrode sheets and separator sheets, which are stacked together and rolled into a roll. Alternatively, the electrode assembly may have a stacked structure where a plurality of positive electrode members, a plurality of negative electrode members, and a plurality of separator members having a generally flat shape form a multi-layered stacked with the separator members separating the electrode members. A first one of the electrode members is electrically connected to the case 12, which serves as the first terminal of the battery. The second one of the electrode members is electrically connected to a terminal structure having a rivet 18 that passes insulatively through a hole in the top cover 14 to serve as the second terminal of the battery.

The battery has a generally cylindrical shape, with the case member 12 constituting the side walls and bottom wall of the cylinder. The case 12 and the cover 14 are made of thin conductive materials such as a metal or metal alloy. Preferably, they are made of aluminum. In the battery shown in FIGS. 1 and 2, the cross-section of the cylinder (cut in a plane perpendicular to the longitudinal direction of the cylinder), which corresponds to the shape of the top cover 14, is substantially rectangular with rounded corners. This type of battery is sometimes referred to as a prismatic battery by those skilled in the field. Alternatively, the cross section may be a circle, an oval, a rectangle with two half-circles at the ends, or other generally elongated shapes.

Figure 3:
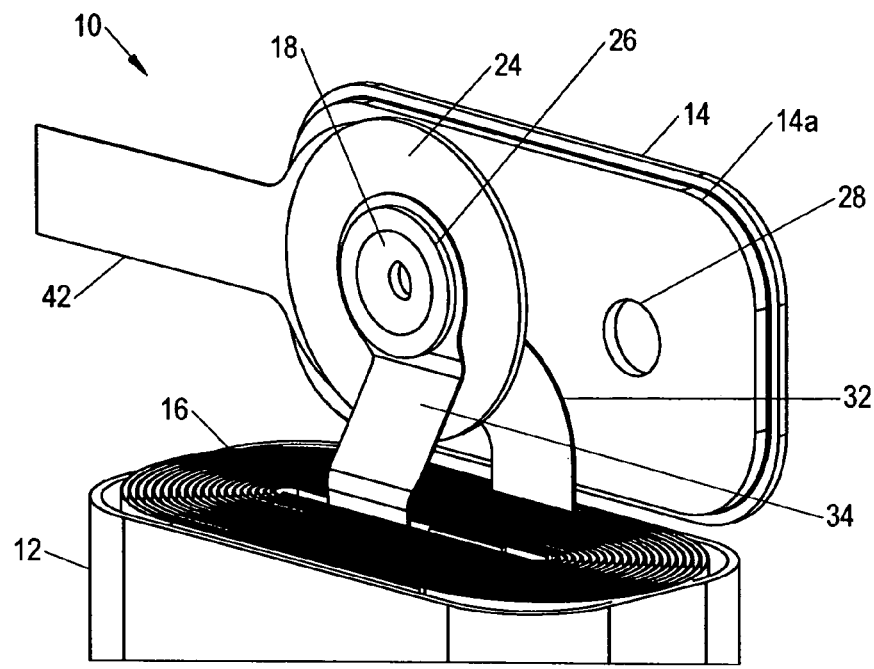
FIG. 3 illustrates a terminal structure according to an embodiment of the present invention.
Figure 4:
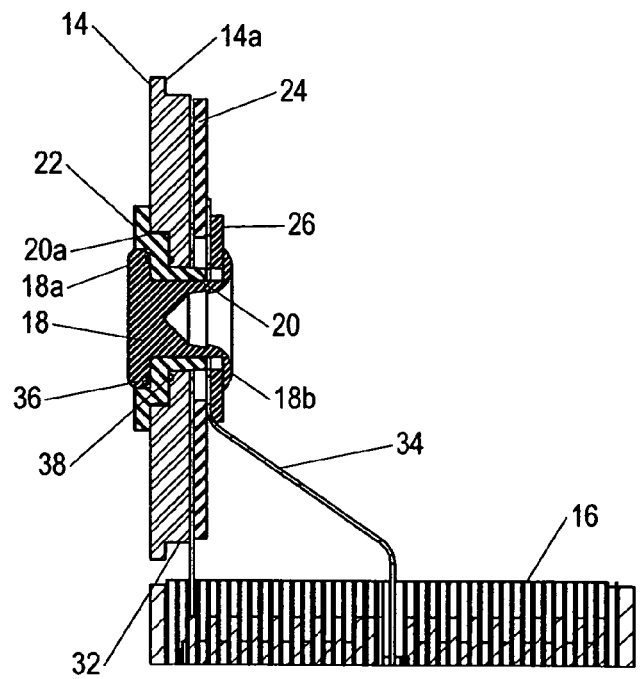
FIG. 4 illustrates the terminal of FIG. 3 in cross section.

FIG. 3 is a plan view and FIG. 4 is a cross-sectional view depicting the construction of the terminal structure employing a rivet 18. The parts fit together to form a sealed structure with little or no space in between. A rivet hole 20 is formed in the cover 14, through which an insulative gasket 22 is disposed. The rivet hole 20 has a counterbore 20a, and the gasket 22 fits against the inner surfaces of both the hole and the counterbore. The counterbore 20a may be formed by punching. The counterbore structure shown in FIG. 4 decreases the likelihood of electrolyte leakage by creating a longer leak pathway (the area between the gasket 22 and the hole/counterbore 20/20a) with sharp edges. Rivet 18 is installed into the gasket-lined cover. A first electrode tab 32 is positioned in direct contact with the cover 14. Alignment tab 42 is provided for use with an alignment fixture to maintain alignment of the terminal parts during assembly, stacking the components on rivet 18. The alignment tab is later removed prior to closing and welding the cover 14 to the case 12. An electrode insulator member 24 has a hole that is aligned with the rivet hole 20 of the cover, and is placed against first electrode tab 32. A second electrode tab 34 is placed against electrode insulator member 24, which electrically insulates first electrode tab 32 from second electrode tab 34. A metal washer 26 is disposed below the second electrode tab 34. The lower portion of the rivet 18 is pressed to form a head 18b to rivet together the gasket 22, the cover 14, the first electrode tab 32, the insulator 24, the second electrode tab 34, and the metal washer 26 to seal the rivet hole. By this structure, the upper head 18a of the rivet is electrically insulated from the battery cover 14, and electrically coupled to the metal washer 26, which is in turn electrically coupled to the second electrode tab 34 as will be described later. Instead of a rivet 18, other kinds of bolts or other fastening devices having a shaft passing through the rivet hole may be used. The fastening device applies a pressure in the axial direction of the rivet hole to press the gasket 22, the cover 14, the first electrode tab 32, the insulator 24, the second electrode tab 34, and the metal washer 26 against each other to form a seal.

The gasket 22 and the insulator 24 are preferably formed of DuPont Teflon® PFA perfluoroalkoxy copolymer resin, or other suitable materials, and the metal washer 26 is preferably made of stainless steel, and more preferably of 300 series stainless steel. Alternatively, copper, copper alloy, or nickel can be used. The rivet 18 is preferably made of stainless steel because of its strength, corrosion resistance, and ease of welding to an external circuit, and more preferably, 300 series stainless steel. Alternatively, the rivet may be made of nickel, copper, nickel plated steel, titanium, or aluminum, depending on the electrolyte and the polarity of the electrode coupled to the rivet.

One or more sealing rings 36, 38 may be provided as described in U.S. Pat. No. 6,673,489, which is assigned to the assignee of the present invention and incorporated herein by reference in its entirety. These sealing rings may be formed integral with gasket 22 and function to increase the pressure between the gasket 22 and the cover 14 (sealing ring 38) and/or the gasket 22 and the rivet 18 (sealing ring 36), which reduces the risk of an electrolyte leak. Furthermore, other features described in U.S. Pat. No. 6,673,489 may be combined with the present invention.

In addition to the rivet hole 20, the top cover 14 is provided with a fill hole 28 for filling the case with an electrolyte solution after assembly, and a fill plug (not shown) that closes the fill hole (FIG. 1). The fill plug may be disk-shaped and is preferably made of the same material as the cover, such as aluminum. The fill hole 28 may be straight or may have a counterbore similar to the rivet hole 20. The top cover 14 preferably has a symmetrical shape, and the rivet hole 20 and the fill hole 28 preferably are located symmetrically with respect to the cover and have identical shapes and sizes. This allows either hole to be used as the rivet hole during assembly, simplifying assembly procedures. The fill plug is fixed to the cover 14, preferably by laser welding between the circumference of the fill plug and the inside surface of the fill hole. A counterbore in the fill hole aids in laser welding by helping to seat the fill plug flat into the hole and by preventing laser light from passing through to the inside of the battery case during welding.

Preferably, the battery case 12 serves as the positive terminal of the battery and the rivet 18 serves as the negative terminal. When the case 12 serves as the positive terminal of the battery, the case 12 and the cover 14 are preferably made of aluminum. Alternatively, the battery case 12 may serve as the negative terminal of the battery and the rivet 18 serves as the positive terminal. In that situation, the case 12 and the cover 14 are preferably made of stainless steel.

The cover 14 has a pressure vent 40 formed therein, as is well known in the art.

The underside of the cover 14 preferably is provided with a cutaway portion along the periphery to form a step feature 14a, allowing the cover 14 to fit over the wall of the case 12. The cover 14 is laser welded to the case 12. The laser is applied from the side direction and the step feature blocks the laser from entering the interior of the case. Alternatively, the side wall of the case 12 may be provided with a cutaway portion along the upper inside rim to provide a step feature, allowing the cover 14 to rest on the step. In that case, the cover 14 is laser welded to the case 12 from the top and the step feature in the case blocks the laser from entering the interior of the case 12. Step features prevent laser light from passing through to the inside of the battery case during welding. Other case to cover joining methods known in the art may be used; for example, the cover may comprise a tapered edge surface that is pressed into a case having no step. In that configuration, the edge of the cover may have a groove in it so that the edge can be deformed to create a smooth, tight seal, facilitating the use of top down welding.

We turn now to the structure of the electrode assembly 16 and its connection to the battery terminals. The electrode assembly 16 shown in FIG. 2 is a rolled electrode assembly, which includes a positive and a negative electrode member physically separated from each other by one or more separator members, the electrode and separator members being stacked together and wound around a mandrel to form the electrode assembly. The separator member physically and electrically separates the positive electrode member from the negative electrode member while allowing for ionic conductivity therebetween through an electrolyte solution. In a preferred assembly method, the electrode tabs 32 and 34 are connected to their respective electrode members prior to winding, and even more preferably, connected at the end of each electrode member that will form the inner portion of the jellyroll. FIG. 3 illustrates an assembly in which tab 34 is connected at the end of its electrode member that forms the inner portion of the jellyroll, and tab 32 is connected at the end of its electrode member that forms the outer portion of the jellyroll. As shown in FIG. 3, once the jellyroll is formed, electrode tabs 32 and 34 may be lie in parallel planes or may even be coplanar. Alternatively, the tabs may be perpendicular or at any other angle with respect to each other. Furthermore, multiple tabs may be provided for each polarity electrode to lower resistance. In that case, all of the positive electrode tabs may be connected to each other, and all the negative electrode tabs may be separately connected to each other. The tabs are mechanically and electrically connected to their respective electrodes; as used herein, tabs formed integral with their respective electrodes, such as an extension of the electrode substrate without active material, are considered "mechanically and electrically connected to their respective electrodes".

The mandrel used to wind the electrode and separate members may be removed after winding the members. Alternatively, the mandrel may remain in the electrode roll after winding. The mandrel is preferably made of copper, copper alloy, or nickel, but other suitable materials may also be used. The shape of the mandrel is not limited and may be a flat metal plate, a circular rod, or an S-shaped mandrel according to the teaching of U.S. Pat. No. 6,673,489.

A first polarity electrode member is electrically coupled via the first electrode tab 32 to the case and/or cover, which serves as a first terminal of the battery. The second polarity electrode member is electrically connected to the second electrode tab 34, either directly, or via the mandrel, to be electrically connected via the washer 26 to a second terminal of the battery formed by the rivet 18 (see FIG. 4). When an aluminum case is used, it is the positive electrode member that is electrically coupled to the case.

An insulating film is provided between the electrode roll 16 and the bottom of the case to prevent short circuits between the positive and negative electrode members. The insulating film preferably includes an adhesive surface and is applied with its adhesive surface either to the bottom of the case 12 or the bottom of the electrode roll 16, before the electrode roll is disposed in the case. The adhesive insulating film is preferably a Kapton® polyimide film tape available from DuPont, or other suitable material. The adhesive serves to maintain the position of the insulating film in the case.

Batteries for implantation in the human body generally are required to be hermetically sealed. Batteries made by the above method have been found to have a leak rate of less than $8 \times 10^{-8}$ atm cc/sec helium. They can be made even more hermetic by covering the seal with epoxy or the like.

Figure 5:
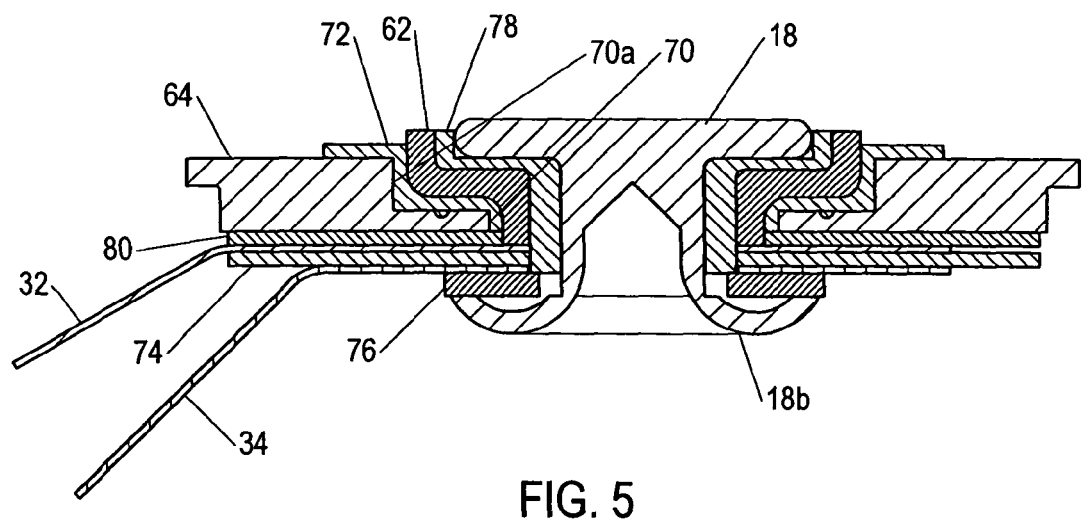
FIG. 5 illustrates in cross section a terminal structure for an embodiment of the present invention having a neutral case.

FIG. 5 shows an alternative embodiment of the present invention in which the battery case is neutral. The battery generally comprises an electrode assembly disposed within a case and covered by a top cover 64. The electrode assembly includes a positive electrode member and a negative electrode member, and one or more separator members interposed in between. A first one of the electrode members is electrically connected to a ring terminal 62. The second one of the electrode members is electrically connected to a rivet 18. Either the rivet 18 or the ring terminal 62 may be positive or negative, with materials chosen accordingly. An insulating film is preferably provided between the electrode assembly and the bottom of the case to maintain neutrality of the case.

A cover hole 70 is formed in the cover 64, through which an insulative outer gasket 72 is disposed. The cover hole 70 has a counterbore 70a, and an outer gasket 72 fits against the inner surfaces of the cover hole 70 and its counterbore 70a. The bottom surface of cover 64 is at least partially insulated with a cover insulator 80, which may comprise Kapton tape, an insulative coating, or other insulator. A ring terminal 62 is installed into the gasket-lined cover. An inner gasket 78 fits against the inner surfaces of the ring terminal 62. Rivet 18 is installed into the inner gasket-lined ring terminal 62. A first electrode tab 32 is positioned in direct contact with the ring terminal 62. An electrode insulator member 74 is placed against first electrode tab 32. A second electrode tab 34 is placed against electrode insulator member 74, which electrically insulates first electrode tab 32 from second electrode tab 34. A metal washer 76 is disposed below the second electrode tab 34. The lower portion of rivet 18 is pressed to form a head 18b to rivet together inner gasket 78, ring terminal 62, outer gasket 72, cover 64, cover insulator 80, first electrode tab 32, electrode insulator 74, second electrode tab 34, and metal washer 76 to seal the rivet hole. By this structure, ring terminal 62 is electrically insulated from battery cover 64 and rivet 18, and is electrically coupled to first electrode tab 32. Rivet 18 is electrically insulated from battery cover 64 and ring terminal 62, and electrically coupled to metal washer 76, which is in turn electrically coupled to second electrode tab 34. The parts fit together to form a sealed structure with little or no space in between. Following formation of the single sealed joint of the battery assembly 16 to the battery cover 14, battery cover 14 is welded to the battery case 12.

It will be apparent to those skilled in the art that various modification and variations can be made in the electrical storage battery of the present invention without departing from the spirit or scope of the invention. Thus, it is intended that the present invention cover modifications and variations that come within the scope of the appended claims and their equivalents.

What is claimed is:

1. An energy storage device, comprising:
   a case having an opening;
   an electrode assembly disposed within the case, the electrode assembly including at least a first polarity electrode member electrically and mechanically connected to a first electrode tab, and a second polarity electrode member electrically and mechanically connected to a second electrode tab;
   a cover disposed to cover the opening of the case, the cover defining a hole; and
   a terminal structure attached to the cover, including:
      a gasket made of an insulating material and fittingly disposed within the hole,
      an electrode insulator member disposed between the first and second electrode tabs, the insulator member defining a hole corresponding to the hole in the cover, and
      a fastening device having a shaft passing through the gasket and the hole in the insulator member, the fastening device applying a pressure in an axial direction of the hole in the cover to press the gasket, the cover, the first electrode tab, the electrode insulator, and the second electrode tab against each other to form a seal, the fastening device being electrically insulated from the cover.

2. The energy storage device of claim 1, wherein the case is electrically connected to the first electrode member and forms a terminal of the energy storage device, and wherein the fastening device is made of a conductive material and is electrically connected to the second electrode member and forms another terminal of the energy storage device.

3. The energy storage device of claim 2, wherein the second electrode member has a higher potential than the first electrode member.

4. The energy storage device of claim 2, wherein the first electrode member has a higher potential than the first electrode member.

5. The energy storage device of claim 1, wherein the hole has a counterbore.

6. The energy storage device of claim 1, further comprising:
   a washer disposed below the second electrode tab and defining a hole corresponding to the hole in the cover.

7. The energy storage device of claim 6, wherein the washer is made of a conductive material and electrically connected to the second electrode tab.

8. The energy storage device of claim 6, wherein the fastening device is electrically connected to the washer.

9. An energy storage device terminal seal, comprising:
   a case cover defining a hole;
   a first polarity electrode tab electrically coupled to the case cover;
   a second polarity electrode tab electrically insulated from the first polarity electrode tab and from the cover; and
   a fastening device having a shaft passing through the hole, the fastening device applying a pressure in an axial direction of the hole to press the cover and the electrode tabs against each other to form a seal, the fastening device being electrically insulated from the cover and electrically coupled to the second polarity electrode tab.

10. The seal of claim 9, wherein the first and second polarity electrode tabs each define a hole and the fastening device shaft passes through each of the electrode tab holes.

11. The seal of claim 9, wherein the first polarity electrode tab is electrically and mechanically coupled to a first polarity electrode, and wherein the second polarity electrode tab is electrically and mechanically coupled to a second polarity electrode.

12. The seal of claim 9, further comprising:
   a washer disposed below the second polarity electrode tab and defining a hole corresponding to the hole in the cover.

13. The seal of claim 9, wherein the washer is made of a conductive material and electrically connected to the second polarity electrode tab.

14. The seal of claim 9, wherein the fastening device is electrically connected to the washer.

15. An energy storage device terminal structure, comprising: one rivet mechanically coupling a first polarity electrode to a second polarity electrode,
   wherein the rivet is electrically coupled to the second polarity electrode and electrically insulated from the first polarity electrode, and
   the first polarity electrode is at a higher potential than the second polarity electrode.

16. An energy storage device terminal structure, comprising: one rivet mechanically coupling a first polarity electrode to a second polarity electrode,
   wherein the rivet is electrically coupled to the second polarity electrode and electrically insulated from the first polarity electrode, and
   the first polarity electrode is at a lower potential than the second polarity electrode.

17. An energy storage device terminal structure, comprising: one rivet mechanically coupling a first polarity electrode to a second polarity electrode,
   wherein the rivet is electrically coupled to the second polarity electrode and electrically insulated from the first polarity electrode, and
   a ring terminal mechanically coupled to the terminal structure by the rivet and electrically coupled to the first polarity electrode.

18. An energy storage device comprising:
   a case having an opening;
   a cover disposed to cover the opening of the case;
   a terminal structure attached to the cover, the terminal structure having one rivet mechanically coupling a first polarity electrode to a second polarity electrode; and
   an electrode assembly disposed within the case and including at least the first polarity electrode and the second polarity electrode mechanically coupled by the rivet.

19. The energy storage device of claim 18, wherein the rivet is positive and the case is negative.

20. The energy storage device of claim 18, wherein the rivet is negative and the case is positive.

21. The energy storage device of claim 18, wherein the rivet is positive and the case is neutral, and further comprising:
   a negative ring terminal.

22. The energy storage device of claim 18, wherein the rivet is negative and the case is neutral, and further comprising:
   a positive ring terminal.

\* \* \* \* \*